Dec. 16, 1952  W. E. URSCHEL  2,621,690
FRUIT STEMMING MACHINE
Filed Dec. 6, 1946  4 Sheets-Sheet 1

INVENTOR.
William F. Urschel
BY
Stone, Artman & Bisson
Attys.

Dec. 16, 1952 W. E. URSCHEL 2,621,690
FRUIT STEMMING MACHINE
Filed Dec. 6, 1946 4 Sheets-Sheet 2
Fig. 2.
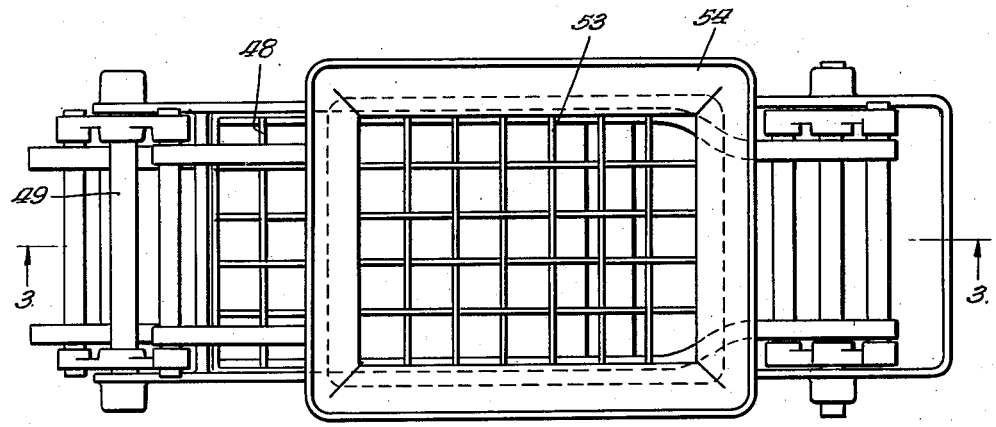
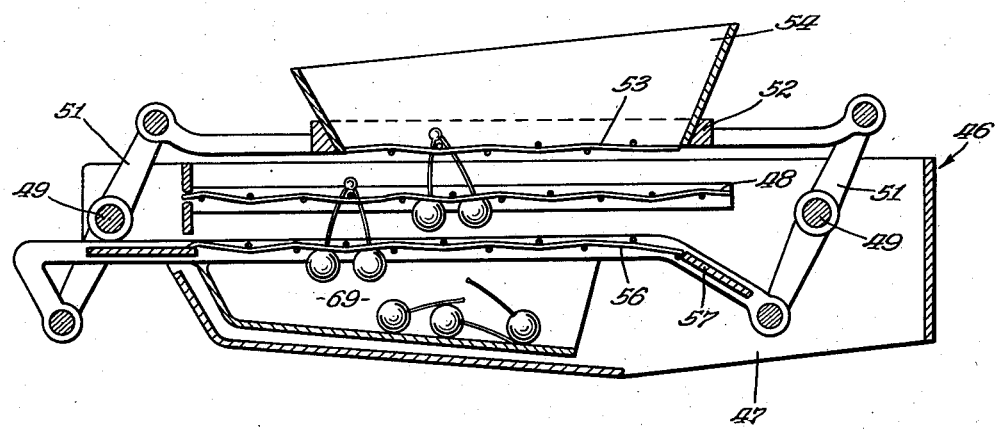
Fig. 3.
INVENTOR.
William E. Urschel
BY
Stone, Artman + Bisson
Attys.

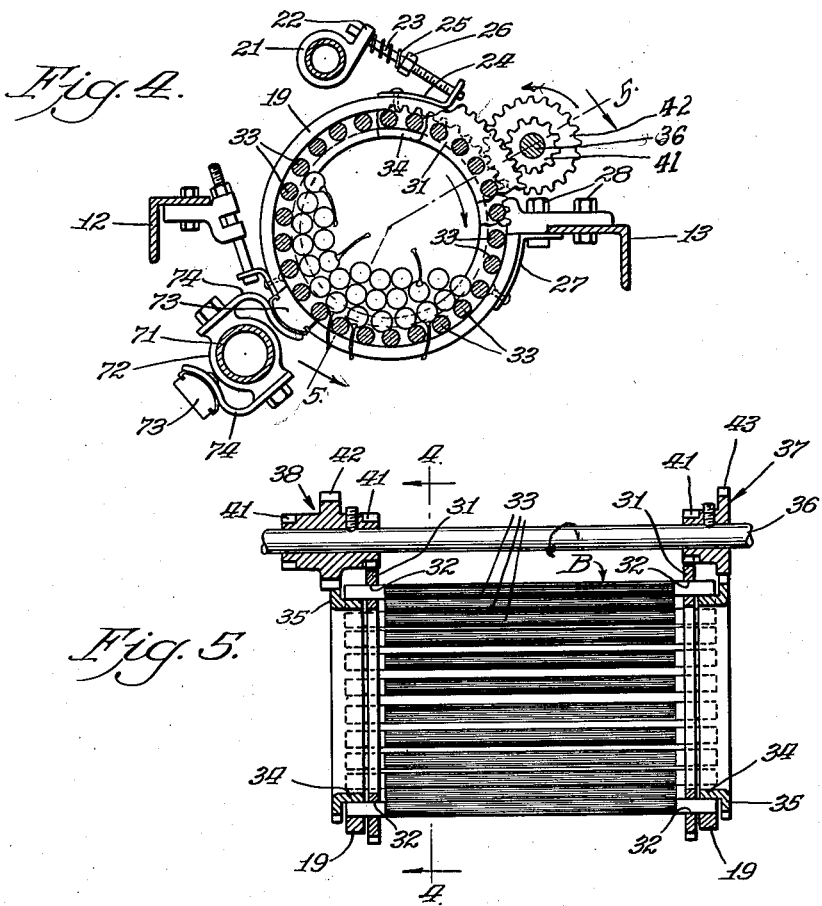
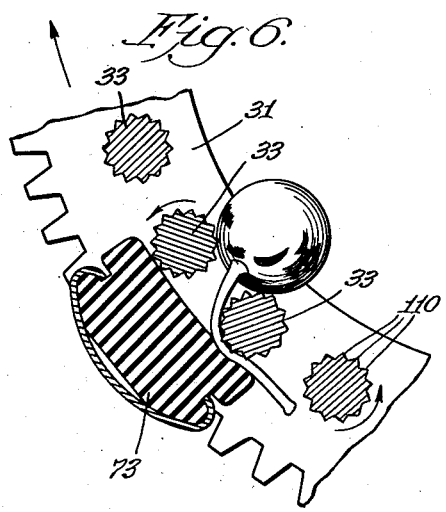

Dec. 16, 1952 W. E. URSCHEL 2,621,690
FRUIT STEMMING MACHINE
Filed Dec. 6, 1946 4 Sheets-Sheet 4
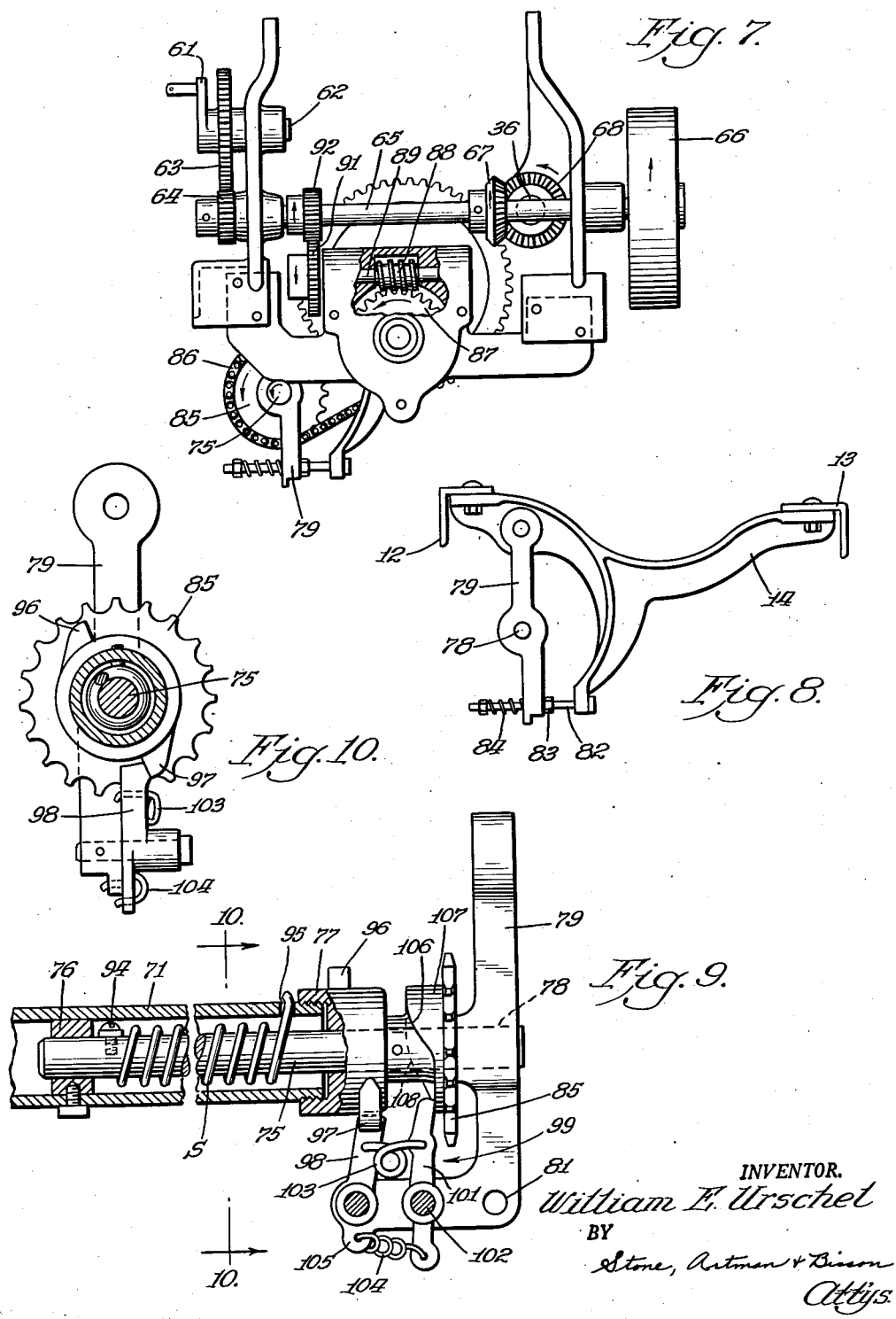

Patented Dec. 16, 1952

2,621,690

UNITED STATES PATENT OFFICE 2,621,690

FRUIT STEMMING MACHINE

William E. Urschel, Valparaiso, Ind.; Joe R. Urschel administrator of said William E. Urschel, deceased Application December 6, 1946, Serial No. 714,385

2 Claims. (Cl. 146—55)

This invention concerns machines for stemming stem-bearing fruit such as cherries. The invention embodiment herein disclosed constitutes an improvement over fruit-stemming apparatus of the character disclosed in United States Patent No. 2,194,058, issued March 19, 1940, to William E. Urschel for fruit-stemming machine.

The present invention relates to a fruit-stemming machine comprising a rotatable cylindrical structure open at both ends and comprising side walls formed of rotatable rods extending lengthwise of the structure and rotatable about their individual axes. This cylindrical structure or tunnel is adapted to receive stem-bearing fruit, particularly cherries, at one end and to tumble the fruit about the interior of the structure during rotation thereof and advance axially of the structure for discharge from the opposite end thereof after the stems have been removed. Removal of the stems is accomplished by virtue of the stems projecting outwardly between the circumferentially spaced rods to facilitate the engagement of the outwardly projecting stems between the outer peripheries of these rods and fruit stem collecting members which are exteriorly of the rotating cylindrical structure and pressed against the rods. An important object of the invention is the provision of means in the form of small projections upon the circumferential periphery of the rods for biting into the projecting stems and thereby increasing the tendency for the stems to be wrapped about the rotating rods while the stems are pinched between such rods and the stem-collecting members. When so caused to follow the rotating peripheries of the rods, the stems are extracted from the fruit which is too large to pass between the circumferentially spaced rods. These small projections upon the rod peripheries are referred to herein as denticles which may be in the form of small ribs extending axially of the rods, knurling, or the like. In addition to biting into the stems to expedite the pulling thereof from the fruit, the denticles of adjacent rods further tend to rotate the fruit articles while their stems are being pulled upon for extraction, and this slight rotation or rocking of the fruit articles increases the ease of extraction by causing the stems to be progressively torn in contrast to being pulled upon in a manner placing substantially uniform stress over the whole zone where the stem is attached to the fruit.

A further object is the provision of a novel cluster breaker for separating the stems from stem clusters.

There is a tendency for the stem-collecting members to become clogged with fruit stems removed from the fruit wherefore the machine is constructed with a plurality of sets of stem collectors mounted upon an intermittently rotated shaft which pursuant to an intermittent rotational movement removes one set of the stem collectors from an operating position adjacently to the stemming rods and places a successive set of stem-collecting members, from which collected stems have been removed, in operating position. A further object of this invention is the provision of a novel means for intermittently rotating the shaft which carries the sets of stem-collecting members.

The above objects of the invention together with certain advantages thereof will become apparent from the ensuing description and the annexed drawings, wherein:

Fig. 2 is a plan view of a cluster-breaking apparatus embodied in the machine;

Fig. 3 is a vertical sectional view taken on the line 3—3 of Fig. 2;

Fig. 4 is a vertical sectional view taken transversely through the rotatable fruit-receiving tunnel as indicated in the plane 4—4 in Figs. 1 and 5;

Fig. 5 is a sectional view taken axially of the tunnel substantially upon the line 5—5 of Fig. 4;

Fig. 6 is an enlarged fragmentary view taken upon a plane transversely intersecting a few of the side wall stemming rods of the fruit-receiving tunnel, and illustrating the function of denticles upon these rods in the stemming of a cherry;

Fig. 7 is an end view of the machine, taken from the right end as viewed in Fig. 1, with certain parts removed for the exposure of driving train elements;

Fig. 8 is a side elevational view of a bracket incorporated into the assembly of Fig. 7;

Fig. 9 is a fragmentary view showing an end portion of the fruit stem collecting member supporting shaft in section and parts of an escapement drive mechanism for said shaft in side elevation;

Fig. 10 is a sectional view taken transversely through the stem collecting member supporting shaft as indicated by the line 10—10 in Fig. 9 and showing parts of the escapement drive mechanism in end elevation; and Fig. 11 is a side elevational view of a stemming rod having a different form of denticle means upon the periphery thereof.

Figure 1:
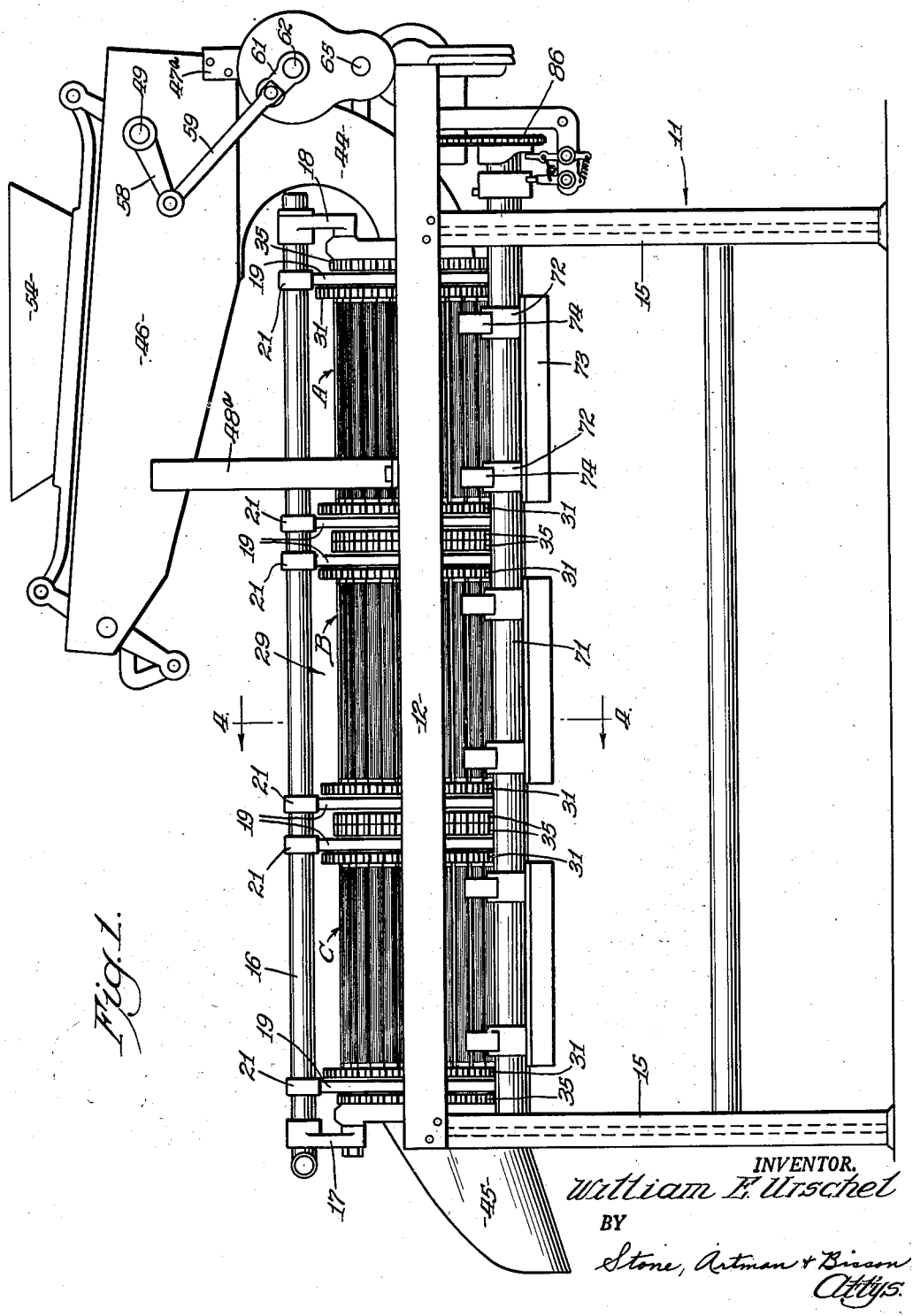
Fig. 1 is a side elevational view of a fruit-stemming machine having parts constructed according to the principles of this invention.

A frame 11 of the machine comprises a pair of laterally spaced angle iron pieces 12 and 13 connected together by transverse members as 14 shown in Fig. 8 and supported by four vertical legs 15 which extend downwardly from opposite end portions of the side members 12 and 13. A pipe 16 is supported above and in parallelism with the frame side members 12 and 13 by means of brackets 17 and 18.

A plurality of circular fabric reinforced rubber straps 19 each has one end anchored to a respective collar 21 mounted adjacently thereto on the pipe 16. The mode of connecting these ends of the flexible straps 19 to their associated collar 21 is illustrated in Fig. 4. Each collar 21 has an apertured ear 22 within which an end of a rod 23 is axially movable. The opposite end of each rod 23 is secured to an upturned end portion of a strap 24 which is riveted to one end portion of its associated circular member 19. A spring 25 about each rod 23 reacts between the associated apertured ear 22 and an adjustable nut 26 on the rod for urging the latter endwise toward the upturned end of the strap and thereby forms a compressible or yieldable connection between one end of the circular member 19 and the anchored collar 21. The opposite end of each circular member 19 is anchored to the frame side member 13 by means of a strap 27 and bolts 28.

These circular flexible straps 19 are for supporting sections of a rotatable and generally cylindrical stemming tunnel 29. Said tunnel comprises three identical axially aligned sections A, B and C. Each tunnel section comprises a pair of ring gears 31 having gear teeth on their outer circular periphery and also having a plurality of circumferentially spaced bearing holes 32. These bearing holes provide journal supports for stemming rods 33.

End portions of the stemming rods 33 projecting through the bearing holes 32 and embraced by the flexible rubber straps 19 are supported by said straps and roll therealong, during rotation of the tunnel, because of frictional contact with said straps. Said straps contact with peripheral portions of the stemming rods which are disposed radially outwardly with respect to the tunnel whereas centering flanges 34 of flanged ring gears 35 are contacted by the radially inner peripheries of the stemming rod end portions.

A suitably supported tunnel drive shaft 36 (more completely illustrated and described in the aforesaid patent) extends in parallelism with the stemming tunnel 29. This shaft has a plurality of gear clusters 37 and 38 constrained for rotation therewith. These clusters provide gears 41 for respectively driving the ring gears 31, wide gears 42 for driving contiguously disposed flanged gears 35, and gears 43 for driving single of the flanged gears 35. Gears 42 and 43 are of the same diameter and are larger in diameter than the gears 41 whereby the flanged gears 35 are driven at an overspeed with respect to stemming rod journalling gears 31. In this manner the flanges 34 on the gears 35 are cooperable with the flexible supporting straps 19 for causing the stemming rods 33 to rotate about their individual axes during rotation of the tunnel at the speed of the gears 31. The tunnel driving shaft 36 is rotated in the direction indicated by the arrow in Fig. 5 wherefore the tunnel 29 and the gears 31 are rotated in the direction indicated by the arrows in Figs. 4 and 6. The frictional contact of the gear flanges 34 and of the flexible straps 19 cause the stemming rods 33 to rotate about their individual axes in the direction indicated by arrows adjacently thereto in Fig. 6.

Unstemmed cherries are fed into the right end of the tunnel 29 as shown in Fig. 1 through a chute 44 and are discharged in the stemmed condition from the opposite end of the tunnel onto a discharge spout 45. The machine is so mounted that the inlet end of the tunnel or right end as shown in Fig. 1 is at higher elevation than the discharge end so that as the tunnel rotates the cherries therein are advanced axially toward the discharge end by the force of gravity.

Prior to entering the chute 44, the cherries are passed through a cluster-breaker mechanism shown in Figs. 2 and 3. The frame 46 of the cluster breaker is carried upon the main frame 11 by uprights 47a and 48a. Frame 46 is in the form of a receptacle and has a bottom opening 47 communicative with the upper end of the chute 44. An intermediate screen 48 is mounted horizontally within the frame 46. A pair of pivot rods 49 extend in parallelism across the interior of the frame 46 in which they are supported. These rods 49 carry levers 51 for pivoting therewith. The upper ends of the levers 51 are pivotally connected with opposite ends of a frame 52 having an opening covered by an upper screen 53. A hopper 54 for the opening in the frame 52 is adapted to receive unstemmed cherries of which the stems are in many instances interconnected as clusters. A lower screen 56 extending in horizontal parallelism with the screens 48 and 53 is supported by a frame 57 which is pivotally connected with and supported by the lower ends of the levers 51.

One end of the pivot rod 49 projects outwardly of the frame 46 where an arm 58 is rotatively fixed thereto. This arm is connected by a drive link 59 with the free end of arm 61 which is constrained for rotation with shaft 62. Shaft 62 is driven by gears 63 and 64, Fig. 7, of which the latter is constrained for rotation with a drive shaft 65 which is driven by a pulley 66. Drive shaft 65 is adapted to drive the tunnel drive shaft 36 through companion beveled gears 67 and 68 which are respectively secured to the shafts 65 and 36; see Fig. 7. During rotation of the drive shaft 65, the levers 51, Fig. 3, will be caused to vibrate oscillatively because of power transmitted thereto through the driving connection including the link 59 shown in Fig. 1. Since the screens 53 and 56 are supported by opposite ends of the levers 51, said screens will be caused to vibrate in planes in substantial parallelism with the intermediate screen 48, and the phase relation of these upper and lower screens will be such that each moves oppositely to the other. Vibrational movement imparted to the frame of the machine is thereby diminished with respect to what it would be if the upper and lower screens vibrated in unison or moved concurrently in the same direction instead of in opposite directions.

In Fig. 3 it can be seen that the screens are spaced apart a distance sufficiently that stem clusters depending from the upper screen can reach sufficiently far to permit passage of cherries thereon through the meshes of the intermediate screen and that a like spacing is provided between the intermediate screen and the lower screen. The mesh of the screens is sufficiently coarse that the fruit articles can pass easily therethrough. Pursuant to vibration of the upper and lower screens, fruit depending from stems lodged upon the upper screen will catch upon the stationary intermediate screen and in this manner will cause the stems to be split apart at their zone of confluency, thereby breaking any clusters depending from the upper screen whereby the stems and fruit broken away from these clusters can fall on through the lowermost screen into a trough 69. Stem clusters lodged on the intermediate screen are pulled apart by the fruit catching upon the lowermost screen whereupon this fruit and the attached stems also drop onto the trough 69. Vibratory motion of the trough with the lowermost screen discharges the fruit and stems dropping thereonto through the opening 47 into the chute 44.

Intermittently rotatable tube 71 is suitably supported in the frame 11 so as to extend in parallelism with the stemming cylinder or tunnel 29 at a position below the side rail 12 and adjacently to the uprights 15. Three sets of paired brackets 72 are rotatively fixed to the tube 71 (see Figs. 1 and 4), and each pair of brackets 72 supports a pair of stem-collecting members or shoes 73 at the end of spring arms 74. Stem-collecting members 73 are made of rubber and are alternately placed against their associated sections of the tunnel 29 in cooperative relation with the rotatable rods 33 as illustrated in Figs. 4 and 6. After being in cooperative relation with the stemming rods 33 for a short time, these shoes collect enough of the fruit stems to become somewhat clogged therewith so as to impair the operation of the machine if they were allowed to remain in the operative position beyond this operative period. Before becoming so clogged so as to materially affect the efficiency of the stemming, the shoes in cooperative relation with the tunnel are removed therefrom by a 180° rotative movement of the tube 71. This intermittent rotative movement of the tube occurs suddenly so that stems collected by a shoe are shaken therefrom pursuant to the placing of the other shoe in the cooperative stemming relation with the tunnel.

Mechanism for intermittently rotating the stemming shoe supporting tubular member 71 is shown in Figs. 1, 7, 9 and 10. One end of the tubular member 71, the right end as illustrated in Figs. 1 and 9, rotatively carries a stub shaft 75 within an internal bearing member 76 and an end bearing cap 77. Stub shaft 75 extends outwardly through the bearing cap 77 into a bearing 78 of an arm 79 which is pivotally connected at its upper end to a crosspiece 14, Fig. 8. The lower end of the arm 79 contains a hole 81 which receives a bolt shank 82 anchored in the crosspiece 14 and carrying a stop nut 83 against which the arm 79 is yieldably urged by a spring 84. Thus the arm 79 and the spring 84 retain the right end of the tubular member 71 yieldably in a position adjacently to the fruit-receiving tunnel 29. The left end of the tubular member 71 is correspondingly supported by an arm similar to the arm 79 but not shown.

The stub shaft 75 is continuously rotated in the direction indicated by the arrow thereon in Fig. 7 by means of a power train including a sprocket 85 constrained for rotation with said stub shaft, a chain 86, a second sprocket (not shown) arranged coaxially with and constrained for rotation with a worm wheel 87 shown in Fig. 7, a worm gear 88 meshed with the worm wheel 87, a shaft 89, and gears 91 and 92 of which the latter is constrained for rotation with the drive shaft 65.

The constantly rotated stub shaft 75 is coupled in driving relation with the tubular member 71 by a wind-up spring S having one end secured to the shaft by a set screw 94 and the opposite end projecting through a hole 95 in said tubular member. Stop members 96 and 97 spaced apart 180° circumferentially of the cap 77 and also spaced axially of said cap are alternately cooperable with a shiftable arm member 98 of an escapement mechanism 99. In Fig. 9 the stop member 97 is shown in abutting relation with the shiftable member 98 whereby the tubular member 71 is prevented from rotation while the stub shaft 75 rotates whereby the spring S is wound up to store energy therein for subsequently imparting rotative motion to the tubular member.

A second arm, 101 of the escapement mechanism, is pivoted to the supporting arm 79 at 102 and is connected to the shiftable arm member 98 by a strong spring 103. A second spring 104 connects a lower end portion of the pivoted lever or arm 101 to an ear 105 of the supporting lever 79 and is under contractive force tending to pivot the lever 101 and the shiftable arm 98 clockwise as viewed in Fig. 9. The force of the spring 104 is eventually overcome, however, by a rise profile 106 of a cam 107 which is constrained for rotation with the sprocket wheel 85 and the shaft 75 so that after the spring S is wound up, the lever 101 will be pivoted counterclockwise and made effective through the spring coupling 103 for pivoting the shiftable arm 98 counterclockwise out of registration with the stop 97 and into registration with the stop 96 whereby the blocking relation of the member 98 with the member 97 is terminated whereby the spring S is allowed to rotate the tubular member 71 180°, which rotation is interrupted by abutment of the stop 96 with the shiftable arm 98. This 180° rotation of the tubular member 71 carries one set of stem-collecting shoes from cooperative relation with the fruit-receiving tunnel and places the other set in such cooperative relation.

Continued rotation of the stub shaft 75 will again wind up the spring S and ultimately a decline profile portion 108 arrives in registry with the upper end of the lever 101, permitting clockwise rotation of this lever and also of the shiftable member 98 connected therewith through the yieldable connection 103 under the influence of the contraction spring 104 so that the shiftable member 98 is removed from registration with the stop 96 to permit another 180° rotative movement of the tubular member 71 and to stop such movement when the stop 97 again abuts the member 98 as illustrated in Fig. 9. This completes an operating cycle of the intermittent drive mechanism for the tubular member 71.

In the operation of the apparatus, the stemming tunnel is caused to rotate clockwise as viewed in Fig. 4 while stem-bearing cherries are caused to tumble about within the tunnel in a formation somewhat as that illustrated in Fig. 4. Since the inlet end of the tunnel will be at a higher elevation than the outlet end thereof, the tumbling cherries will progress toward the outlet or left end of the tunnel as shown in Fig. 1.

Stems of some of the cherries will project outwardly through the tunnel wall as illustrated in Fig. 4 and rotation of the tunnel will carry these stems into gripping relation between one of the stem-collecting shoes 73 and the stemming rods between which the stems project. The stems are caught between the stemming rods and the stem-collecting shoes in some such fashion as that illustrated in Fig. 6. While the stems are so caught, the extraction thereof from the fruit is expedited by rotation of the stemming rods 33 about their individual axes. Rotation of the tunnel is in the direction indicated by the arrow associated with the ring gear 31 in Fig. 6 and because of the contact of end portions of the rods 33 with the more rapidly rotating flange 34 of the flanged gear 35 in contact with these rod end portions, said rods 33 will be caused to rotate counterclockwise as viewed in Fig. 6. These rods 33 have denticles 110 in the form of pointed ribs extending axially thereof. These denticles cooperate with the stem-collecting shoes 73 in gripping onto the fruit stems and causing the stems to follow the peripheries of these rods about the individual axes of these rods and thereby withdraw the gripped stems endwise outwardly from between the rods. Extraction of the stems from the fruit is further facilitated by the denticles of adjacent rods 33 having a cooperative rolling action upon fruit articles of which the stems project between such adjacent rods. For example, the rod 33 on the right side of the fruit stem illustrated in Fig. 6 tends to rotate the illustrated fruit article clockwise about the midpoint of such article and a similar action is had by the denticles upon the rod 33 to the left of said fruit stem. The denticles slightly indent in the fruit enabling these denticles on adjacent rods to slightly rotate the fruit while the stem is being pulled and in this manner to cause the stem to be pulled upon sidewise as well as endwise and pried or torn progressively from the fruit by means of less force than would be required if the stem were pulled upon substantially radially from the geometric center of the fruit article.

In Fig. 11 there is illustrated a fruit-stemming rod 33a corresponding to the rods 33 but having denticles 110a formed by criss-crossing grooves upon the cylindrical periphery of the rod, whereby specule-like denticles are formed instead of the rib-like denticles 110 of the rods illustrated in Figs. 5 and 6.

Having thus described a preferred form of the invention with the view of clearly and concisely illustrating the same, I claim:

1. In a fruit-stemming machine, a rotatable tunnel comprising side walls of stemming rods extending axially of said tunnel and spaced apart circumferentially thereof sufficiently for the stems of fruit articles to project outwardly of the tunnel between adjacent of the rods but insufficiently spaced for outward passage of the fruit articles therebetween, a stem-collecting structure having a reaction surface disposed exteriorly of said tunnel contiguously to said rods so that the outwardly projecting stems are lodged between such surface and outer peripheral portions of the rods while the rods are swept past said surface pursuant to rotation of the tunnel, said lodged stems being operable to pull the fruit articles attached thereto against inner peripheral portions of the adjacent rods, the peripheries of said rods being denticulate and the denticles upon said inner peripheral portions of the rods being adapted to slightly indent the fruit articles pulled thereagainst, and means for rotating said rods about their individual axes in the same direction to cause their outer peripheries to move circumferentially of the tunnel in the direction opposite to that in which the rods are bodily swept past said reaction surface to cause the denticles penetrating the fruit articles as aforesaid to roll said articles and thereby contribute to progressive tearing of the stems from the fruit articles.

2. In a fruit stemming machine, a rotatable cylinder structure for containing stem-bearing fruit and having side walls containing open spaces through which the fruit stems project outwardly, a rotatable shaft exterior to and extending in parallelism with said cylinder and having thereon sets of circumferentially spaced stem-collecting members each being operable when disposed adjacently to the cylinder side wall to withdraw and collect said projecting stems, circumferentially spaced stop members upon said rotatable shaft and staggered endwise thereof, an escapement device comprising a pivoted arm of which a free end portion is alternately moveable into circumferential registration and blocking relation with said stop members, a constantly rotating spring-driving shaft disposed coaxially with the collecting member shaft, a spring connected between said shafts and being so constructed and arranged as to be wound up for storing energy utilizable to rotate the collecting member shaft when the escapement arm is displaced from blocking relation with either of said stop members, a second pivoted arm adjacent the first arm, means yieldably interconnecting said arms for imparting pivotal movement from the second arm to the first of such arms, spring means acting upon the second of said arms to urge the same to pivot in the direction that is operable through said yieldable connecting means for urging the first arm into blocking relation with one of such stop members, cam means rotatable with said spring-driving shaft and having profile portions successively sweepable past the second arm and for limiting pivotal movement of the second arm in the direction urged by said spring, one of said profile portions being operable to pivot the second arm against the force of said spring to displace the first arm into blocking registration with the other of said stop members, the other of said profile portions facilitating the pivoting of the second arm under the influence of said spring for urging the first arm from a blocking relation with said other stop member into position for blocking the one stop member, and said stop members having a circumferential spacing with respect to that of said stem-collecting members that a collecting member will be disposed adjacently to said cylinder coordinately with a respectively-associated stop member being blocked by the escapement device arm.

WILLIAM E. URSCHEL.

REFERENCES CITED

The following references are of record in the file of this patent:

UNITED STATES PATENTS

| Number | Name | Date |
|---|---|---|
| 293,922 | Hoevenbergh | Feb. 19, 1884 |
| 1,617,105 | Frist | Feb. 8, 1927 |
| 2,194,058 | Urschel | Mar. 19, 1940 |
| 2,323,668 | Morgan | July 6, 1943 |
| 2,382,134 | Coons | Aug. 14, 1945 |
| 2,383,263 | Morgan | Aug. 21, 1945 |